US010283084B2

(12) United States Patent
Broadbent et al.

(10) Patent No.: US 10,283,084 B2
(45) Date of Patent: May 7, 2019

(54) INFORMATION DISPLAY DEVICE (71) Applicant: TomTom International B.V., Amsterdam (NL)

(72) Inventors: Samuel Mark Broadbent, Amsterdam (NL); Andrew John Roy Tattersfield, Amsterdam (NL); Nicholas Alexander Evans, Amsterdam (NL)

(73) Assignee: TOMTOM INTERNATIONAL B.V., Amsterdam (NL)

( * ) Notice: Subject to any disclaimer, the term of this patent is extended or adjusted under 35 U.S.C. 154(b) by 0 days.

(21) Appl. No.: 14/785,354

(22) PCT Filed: Apr. 17, 2014

(86) PCT No.: PCT/EP2014/057981
§ 371 (c)(1),
(2) Date: Oct. 19, 2015

(87) PCT Pub. No.: WO2014/170469
PCT Pub. Date: Oct. 23, 2014

(65) Prior Publication Data
US 2016/0086577 A1    Mar. 24, 2016

(30) Foreign Application Priority Data
Apr. 17, 2013    (GB) .................................. 1306989.3

(51) Int. Cl.
*G09G 5/10*  (2006.01)
*G01C 21/26*  (2006.01)
(Continued)

(52) U.S. Cl.
CPC ............. *G09G 5/10* (2013.01); *G01C 21/265* (2013.01); *G04G 17/045* (2013.01); *G04G 17/08* (2013.01);
(Continued)

(58) Field of Classification Search
CPC ........... H04N 7/18; G09G 5/10; G04G 17/045
(Continued)

(56) References Cited

U.S. PATENT DOCUMENTS 5,892,455 A * 4/1999 Matsumoto ............ G08B 5/228
340/7.55
6,443,614 B1 * 9/2002 Read .................... G04G 9/0064
368/187
(Continued)

FOREIGN PATENT DOCUMENTS

CN    1330303 A    1/2002
CN    1330310 A    1/2002
(Continued)

OTHER PUBLICATIONS

"Training Guide the First Fashion-Forward Touch Activated Watch", #0 Aug. 2010, Retreived from the Internet: URL: http://shop0334.hostedshop.dk/upload_dir/docs/KC_TOUCH_TrainingGuide_Lo.pdf [retrieved on Jul. 18, 2014] XP055129981.
(Continued)

*Primary Examiner* — Calvin C Ma (57) ABSTRACT

A portable information display device 1 is disclosed comprising an electronic display module 2 comprising a substantially rectangular display screen 6 and an optical element 14 arranged in front of the electronic display module to form a non-rectangular optical frame extending outside the rectangular display screen. Illuminating means 22, 34 behind the optical frame is arranged to illuminate at least one icon 8 defined by the optical element outside the rectangular display screen, and an electronic controller 24 for the illuminating means is arranged to selectively illuminate the at least one icon outside the rectangular display screen.

17 Claims, 7 Drawing Sheets

(51) Int. Cl.
*G04G 17/08* (2006.01)
*G04G 17/04* (2006.01)
*G06F 3/0481* (2013.01)
*G06F 3/02* (2006.01)
*G06F 3/041* (2006.01)
*G06F 3/0482* (2013.01)
*G06F 3/0354* (2013.01)
*G04G 9/00* (2006.01)
*G04G 21/00* (2010.01)

(52) U.S. Cl.
CPC .......... *G06F 3/0202* (2013.01); *G06F 3/0219* (2013.01); *G06F 3/03547* (2013.01); *G06F 3/041* (2013.01); *G06F 3/0482* (2013.01); *G06F 3/04817* (2013.01); *G04G 9/0064* (2013.01); *G04G 21/00* (2013.01)

(58) Field of Classification Search
USPC .......................................... 348/158; 455/566
See application file for complete search history.

(56) References Cited

U.S. PATENT DOCUMENTS

| | | | |
|---|---|---|---|
| 6,525,997 B1* | 2/2003 | Narayanaswami | G04G 9/0082 368/223 |
| 6,556,222 B1 | 4/2003 | Narayanaswami | |
| 9,572,533 B2* | 2/2017 | Venkatraman | A61B 5/02416 |
| 2006/0059947 A1* | 3/2006 | Gore | A44C 5/00 63/1.13 |
| 2006/0073851 A1* | 4/2006 | Colando | G04G 9/0064 455/566 |
| 2009/0185458 A1* | 7/2009 | Harley, Jr. | G04B 19/30 368/227 |
| 2009/0257231 A1 | 10/2009 | Fujikawa et al. | |
| 2011/0205851 A1 | 8/2011 | Harris | |
| 2013/0163390 A1* | 6/2013 | Gossweiler, III | H04M 1/72552 368/14 |
| 2013/0187780 A1* | 7/2013 | Angelides | A61B 5/0002 340/573.1 |
| 2014/0139422 A1* | 5/2014 | Mistry | G06F 3/014 345/156 |

FOREIGN PATENT DOCUMENTS

| | | |
|---|---|---|
| CN | 1337607 A | 2/2002 |
| CN | 201897703 U | 7/2011 |
| CN | 102316194 A | 1/2012 |

OTHER PUBLICATIONS

International Search Report dated Jul. 28, 2014 for International Application PCT/EP2014/057981 as filed on Apr. 17, 2014.

* cited by examiner

INFORMATION DISPLAY DEVICE

CROSS-REFERENCE TO RELATED APPLICATIONS

The present application is a National Stage of International Application No. PCT/EP2014/057981, filed April 17, 2014 and designating the United States, which claims benefit to United Kingdom Patent Application Serial No. GB1306989.3 filed on April 17, 2013. The entire content of these applications are incorporated herein by reference.

FIELD OF THE INVENTION

The present invention relates to information display devices, and particularly to mobile or portable information display devices. Illustrated embodiments of the invention may relate to portable information display devices including mobile phones, smart phones, PDAs, tablet computers, other handheld personal computers, and portable navigation devices (so-called PNDs).

BACKGROUND TO THE INVENTION

Information display devices, and in particular portable information display devices, have become commonplace in everyday life for the purposes of communication, navigation, entertainment, etc. Typically such information display devices are not passive display devices but include a processor and memory which cooperate to provide an execution environment in which a software operating system may be established, and various software programs may be run to provide the device with interactive display and information processing functions. Furthermore, such devices generally include one or more user input interfaces that allow a user to interact with and control the device. An electronic display screen is provided as an output interface for relaying information to the user. The display screen may be configured to provide a touch sensitive display that can also be used as a user input interface.

In such devices the electronic display screen is usually a colour display in the form of a substantially rectangular screen. Modern manufacturing techniques are not yet able to produce colour display screens, e.g. based on LED or LCD technology, that are non-rectangular for the size of screen which is typical for handheld use, e.g. at least 2.4 inches (6 cm). The rectangular geometry of the underlying display screen is carried over into the overall shape of the information display device, so that the device has a rectangular frame around the screen. Device designers are constrained to this rectangular geometry. Some information display devices can include physical user input buttons in the frame surrounding the rectangular screen. However, there tends to be very little functionality provided by the frame outside the rectangular display screen.

The present invention seeks to provide improvements in portable information display devices.

SUMMARY OF THE INVENTION

The present invention provides a portable information display device comprising: an electronic display module comprising a substantially rectangular display screen; an optical element arranged in front of the electronic display module to form a non-rectangular optical frame extending outside the rectangular display screen; illuminating means arranged behind the optical frame to illuminate at least one icon defined by the optical element outside the rectangular display screen; and an electronic controller for the illuminating means that is arranged to selectively illuminate the at least one icon outside the rectangular display screen.

According to the present invention, the information display device presents a user with a display that is not rectangular, as is conventional, but with a non-rectangular interface as defined by the optical frame. Furthermore, the optical frame defines at least one icon outside the rectangular display screen which can be selectively illuminated so as to provide the user with an additional information display within the non-rectangular frame. The functionality of the device is increased by the ability to illuminate one or more off-screen icons separately from illumination of the main rectangular display screen. The overall effect in the eyes of the user is a device that can display information across the non-rectangular display defined within the optical frame.

The optical frame extending outside the rectangular display screen provides the novel ability to illuminate one or more icons that may convey information to a user without wasting power using the main rectangular display screen. In one set of examples, the information display device may include a software program for navigation that is output via the rectangular display screen. However, it may not be necessary or desirable for an output of the navigation software to be displayed at all times, and therefore the rectangular display screen may be inactive when navigation functionality is not being used. For instance, navigation information may only be displayed on the rectangular screen from time to time, while the one or more off-screen icons may provide a user interface at other times. It is a benefit of the present invention that the information display device can use a standard rectangular display screen (for example a colour LED or LCD screen) but uses the additional optical element to provide a user with an overall interface defined by the optical frame that is non-rectangular.

It will be appreciated that the non-rectangular optical frame may have any shape as desired, for example a triangular or polygonal shape such as pentagonal, hexagonal, etc. The optical frame may have a non-polygonal shape that is symmetrical (for example elliptical) or asymmetrical (for example teardrop-shaped). Of course a myriad of different shapes may be envisaged for the optical frame which is limited only by the imagination of the device designer. In a preferred set of embodiments the optical element defines a substantially circular optical frame. A circular frame may be preferred in a portable information display device that is intended to be used inside a vehicle, for example a device that can be mounted to a dashboard, so that the device has an appearance in keeping with other display dials on the dashboard. Of course such a device may also find use in connection with other dashboards, control boards or user interfaces that typically include circular displays such as dials, gauges and the like.

The portable information display device preferably presents to a user, viewing the front of the device, a non-rectangular, e.g. circular, display as defined by the optical frame. The display is preferably flat. In one set of embodiments the front of the device, seen in plan view, also has a non-rectangular, e.g. circular, shape matching the optical element. The device may therefore have an overall geometry that is at least partly non-rectangular, e.g. circular. However it is not essential for the outer shape of the device to match the non-rectangular, e.g. circular, display as it is the front display that is preferably seen by a user to have the appearance of a dial or gauge, e.g. as commonly found on a vehicle dashboard. Of course the back of the device may have a different shape, but in at least some examples the device maintains the same non-rectangular, e.g. circular shape in cross-section. The device may have an overall shape that is discoid. For ease of handling, the back of the device may not be flat but curved. For example, the back of the device may have a generally convex shape so that it sits in the palm of a hand.

It is desirable for the information display device, or at least its display, to have the appearance of an overall non-rectangular, e.g. circular, interface without the rectangular outline of the main display screen being visible when the screen is not illuminated. It is therefore preferable for the optical frame to provide a uniform visual appearance when the rectangular display screen is not in use. This may be achieved by selecting the material and transmittance of the optical element so that the visual appearance of the frame matches that of the dormant screen. The optical element may include one or more layers which provide different degrees of optical transmittance.

In one set of embodiments, the optical element preferably comprises a light diffusion layer having a non-zero transmittance that is less than 100%. In other words, the light diffusion layer is tinted so that only a percentage of light may be transmitted therethrough. The non-zero transmittance of the light diffusion layer is preferably chosen so as to obscure the outline of the rectangular display screen from a user's view, but without detrimentally reducing the visibility of the display screen and/or icon(s) when either are illuminated. The non-zero transmittance of the light diffusion layer is preferably less than 90%, 80%, or 70% but is preferably more than 20%, 30%, 40% or 50%. The non-zero transmittance of the light diffusion layer may be in the range of 60-70%. The effect of the tinted light diffusion layer may be to provide the device with a visual appearance that is substantially uniform within the non-rectangular optical frame. When the rectangular display screen is not illuminated, therefore, the user cannot discern anything other than the non-rectangular outline of the optical frame.

In addition, or alternatively, the optical element preferably comprises an optical layer in which the at least one icon is defined as a transparent window, preferably a 100% transmittance window, within a background having zero transmittance. This ensures that the optical frame can only be illuminated at the location(s) of the icon(s). Similarly, in this layer the outline of the rectangular display screen may also be defined as a transparent window, preferably a 100% transmittance window, within a background having zero transmittance. In both cases, this may be achieved by printing a black (i.e. 0% transmittance) background around the windows in this optical layer of the optical element. The zero transmittance background is useful for obscuring from view any components of the device located behind the optical element, so that a user sees only illumination of the icon(s) and/or illumination of the rectangular display screen.

In addition, or alternatively, the optical element may comprise an optical layer having a light diffusion area positioned over each icon. The light diffusion area(s) may have a non-zero transmittance that is less than 100%, preferably less than 50%, 40%, 30% and further preferably less than 20%. The heavier tint of these light diffusion area(s) which is localised over the icon(s) can help to hide any components behind the optical element that may otherwise be visible through the transparent window defining the icon. Furthermore these tinted areas can provide a light diffusion effect so that the icon(s) appear to have an even distribution of illumination. This may also be helpful to make the display look uniform, e.g. if the one or more icons defined by the optical element are illuminated with a brightness that is different to that of the rectangular display screen.

Of course the optical element may comprise one or more further or alternative optical layers which define one or more of: an icon, graphics, text, insignia or any other information-conveying device that is intended to be visible. For example, a layer of the optical element may be printed with a name or logo. Each of the optical layers mentioned above may be distinct physical layers or simply different layers of optical transmittance provided on the same physical substrate, for example as a result of different layers of printing.

The device may use a single icon defined within the optical frame outside the rectangular display screen, for example illuminated by one or more different colours of light to convey different information to a user. However it is preferable for a plurality of icons to be defined by the optical element outside the rectangular display screen. Furthermore, the electronic controller is preferably arranged to selectively illuminate each one of the plurality of icons. This means that each of the icons may be independently selected for illumination and different icons may be illuminated at different times. This enhances the range of information that can be conveyed to a user by the icons without necessarily requiring illumination of the main rectangular display screen. One way of selectively illuminating each of the plurality of icons could be to couple a single illuminating means with multiple light guides that serve to independently transmit light to different ones of the icons. But for convenience it is preferable for the illuminating means to comprise a plurality of independent light sources. Preferably each light source is arranged to illuminate a respective icon. The electronic controller can then act to selectively illuminate one or more of the icons simply by turning on or off the respective light source(s). Any suitable light source may be used, but in one set of embodiments the illuminating means comprises a plurality of light emitting diodes (LEDs). Of course different ones of the light sources, e.g. different LEDs, may emit light at different wavelengths so as to provide for different colours of illumination for various ones of the icons.

Even when each of the plurality of icons is illuminated by its own dedicated light source, there may be a risk of the light emitted from one source accidentally illuminating another one of the icons or at least spread outwardly so that other(s) of the icons become visibly discernable even when they are not intended to be illuminated. It is therefore preferable for the device to further comprise light guiding means arranged to transmit light from the illuminating means separately to each of the icons. If the illuminating means comprises multiple light sources then the light guiding means preferably comprises a plurality of separate light guides each coupling one of the light sources to a respective icon.

The illuminating means may be provided in the same plane as the electronic display module. It is possible that the illuminating means may even be integrated with a printed circuit board that is shared with the electronic display module. However it may be preferable for the illuminating means to be arranged behind the electronic display module, e.g. mounted on its own control board. In this case it may be preferable for a light guiding means to be arranged in front of the illuminating means so as to guide light past the electronic display module to the optical element in front thereof. In a set of embodiments the light guiding means may be integrated with a chassis mounting the electronic display module in the device. The light guiding means may take the form of apertures formed in an otherwise opaque chassis. Preferably each aperture is positioned in front of a light source of the illuminating means so as to guide light forwards to a respective icon defined by the optical element, for example in front of the electronic display module. Of course any other suitable light guiding means may be used, such as a light pipe or optical fibre. Furthermore, the light guiding means may provide a guiding function not only using light transmission but also, or alternatively, light reflection.

The device may be provided with one or more further features to prevent the leakage of light between different areas of illumination. For example, if the main rectangular display screen is illuminated then it is preferable that light does not leak from the screen to the icon(s) defined outside the screen so as to cause one or more icons to be accidentally illuminated when not so intended. It is therefore preferable for the electronic display module to be surrounded by a sealing gasket to prevent the sideways leakage of light. On the other hand it is also desirable that illumination of one of the icons does not result in a light leaking sideways into the area of the rectangular display screen, and this may be avoided by defining the icons in a zero transmittance, i.e. black background, as is mentioned above. In addition, so as to prevent light from leaking out of the device sideways at the user interface, it is preferable for the optical element to be surrounded by a bezel defining the front of the device. The bezel may have an annular side wall arranged not only to hold the optical element in place but also to focus illumination forwards so that a user sees only a front circular panel being illuminated. The bezel is preferably fixed.

According to the invention the electronic display module may utilise any suitable technology for the rectangular display screen, for example including one or more of a liquid crystal display (LCD) panel, light emitting diode (LED) panel, including organic LEDs (oLDs) and polymer LEDs (pLEDs), and/or an electro luminescent (EL) panel. In one set of embodiments the rectangular display screen is preferably an LCD panel provided with back lighting. A colour, rather than monochrome, display screen is preferred. An information display device that presents a non-rectangular, e.g. circular, display is particularly unique in the field of LCDs as colour LCDs are not available in a non-rectangular form for handheld devices such as mobile phones, smart phones and portable navigation devices. There are no such devices available today that use a circular colour LCD display screen, or that use an optical element to convert a rectangular display screen into a colour display having a non-rectangular optical frame.

As well as displaying information, it is preferable that information can be input to the device by a user. The device may include one or more input means including "hard" physical buttons and/or "soft" touch pad or touch screen buttons provided on the device. Physical buttons may, for example, be provided on the sides or edges of a housing for the device. In one set of examples a physical button may be associated with each icon defined within the optical frame so that a function can be selected by pressing the button when the associated icon is illuminated. However, it is preferable for the primary user input means to take the form of a touch pad or touch screen. Touch-sensitive input means may be provided by the rectangular display screen and/or by the optical element. In a set of embodiments it is preferable for the optical element to provide touch sensitivity in association with each icon. This may be more intuitive than using physical buttons (e.g. located at the sides of the device) and also optimises the appearance of the device as having a circular user interface similar to a gauge or dial on a dashboard. Of course one or more physical buttons may still be provided, e.g. a hard switch for turning the device on and off.

As is mentioned above, the optical element preferably comprises a touch-sensitive user interface within the non-rectangular, e.g. circular, optical frame. The touch-sensitive user interface may have a touch pad associated with each icon. The touch-sensitive user interface may comprise resistive and/or capacitive sensing methods. However, in many examples capacitive sensing is preferred to maximise the contrast of the display. The touch-sensitive user interface may comprise a printed circuit board that carries a capacitive sensor pad arranged to coincide with each icon. The capacitive sensor pad may be hollow to allow for illumination of the icon, e.g. using an aperture cut out in the printed circuit board. The printed circuit board may be flexible. It is possible for the touch-sensitive user interface to extend across the rectangular display screen so as to provide the display screen with the functionality of touch pad or touch screen inputs, but this may require electrical connection to be made between the touch-sensitive interface of the optical element and the electronic display module in order to implement touch sensitive interaction with the display screen. If anything, the touch-sensitive user interface extending across the rectangular display screen may simply allow a user to touch the display screen so as to turn it on or off. For advanced interactions, it is preferable that the electronic display module provides its own touch pad or touch screen integrated with the rectangular display screen. So as to avoid interference between the touch-sensitive user interface provided by the optical element and the rectangular display screen, it may be preferable for the optical element to be provided with a touch-sensitive user interface only in the area of the optical frame extending outside the rectangular display screen. If the rectangular display screen does not have its own touch sensitive input functionality then the touch-sensitive interface in the optical frame may provide the primary means of user input for the device. A user may therefore input information to the device by touching one or more of the icons that are illuminated in the optical frame outside of the rectangular display screen. The touch-sensitive interface is preferably connected to the electronic controller for the illumination means.

A portable information display device as described herein is preferably a device that processes information rather than merely acting as a passive display. Embodiments of the invention therefore relate to a portable information processing and display device comprising a processor. As is mentioned above, the information display device may take the form of a mobile phone, smart phone, PDA, tablet computer, portable personal computer or portable navigation device (PND). In a set of embodiments it is preferable for the device to include a global navigation satellite systems (GNSS) receiver, such as a global positioning system (GPS) receiver, to provide navigation satellite signal reception and processing functionality. This can allow the device to determine its geographical location. In addition, or alternatively, it is preferable for the device to include a mobile telecommunications device, such as a general packet radio service (GPRS) transceiver, for wirelessly connecting to a telecommunications network. This can allow the device to communicate with a server for substantially real time services such as traffic updates, weather information, speed camera alerts, software updates, etc.

Additionally, or alternatively, the portable information display device is preferably configured to execute location-based software so as to provide one or more functions, such as route planning, destination information, travel and/or traffic information, real-time traffic updates, estimated time of arrival, alternative route suggestions, favourite destinations, navigation, etc.

The portable information display device is preferably a handheld device. In addition, or alternatively, the device is preferably configured to be mounted as a stationary display, e.g. in a car or other vehicle. The information display device is preferably not a wearable device. The non-rectangular, e.g. circular, optical frame may have any suitable size for a portable device, but is preferably large enough to provide a display that can be viewed at a range of distances, e.g. up to one meter. The optical frame may therefore have a largest dimension that is at least 6 cm and preferably around 8 cm, 10 cm, 12 cm, 15 cm and up to 20 cm.

The portable information display device may be provided with one or more further features to enhance its functionality. The device may include output means other than the visual display, for example an audible output means such as a loudspeaker. The device may include audible input means such as a microphone so that voice commands can be input as well. For devices that are location-aware and/or have wirelessly connectivity, the device preferably comprises a GNSS receiver (and associated antenna) and/or a mobile telecommunications device, such as a GPRS antenna/receiver. The antenna/receiver may be located anywhere that is suitable in or on the device. In one set of embodiments the GPRS antenna/receiver is integrated with a housing for the device, and preferably integrated with a back cover of the housing. This means that the antenna/receiver can be held close to the outer surface of the device to optimise reception. Furthermore, the same back cover may be used to house an electronic controller (e.g. on a printed circuit board) for the GPS or GRPS antenna/receiver, which may be electrically connected to the electronic display module and/or electronic controller for the illuminating means.

The information display device may include one or more physical connector interfaces by means of which power, and optionally data signals, can be transmitted to and received from the device. The data connection can be wired or wireless. Optionally one or more wireless transmitters/receivers may be provided to allow the device to communicate over cellular telecommunications and other data networks, for example Wi-Fi, Bluetooth, GPRS and the like. In one set of examples, the device may include a USB socket so that power and/or data can be transferred when the device is docked on a suitable USB connector. The portable device may be conveniently mounted to a USB dock provided on the dashboard or windscreen of a vehicle, or provided as part of the vehicle's onboard systems. The portable device can be docked to any vehicle such as a car, motorbike, bicycle or boat for example. The device can be removed from the docking point for portable or handheld use.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Some embodiments of the present invention will now be described, by way of example only, and with reference to the accompanying drawings, in which.

Like reference numerals are used for the like features throughout the drawings.

DETAILED DESCRIPTION OF THE PREFERRED EMBODIMENTS

Figure 1A:
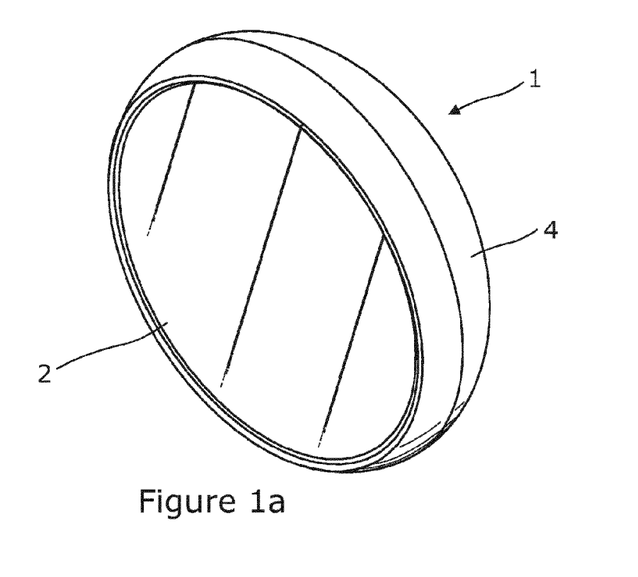
FIG. 1a is a perspective view of an information display device according to an embodiment of the invention.

There is seen in FIG. 1a a portable information display device 1 which has a substantially flat and circular display 2 carried at the front of a rounded housing 4. When the circular display 2 is not in use, it has the visual appearance of a uniformly dark disc, as is seen from FIG. 1b. When the display is in use, as is shown in FIG. 1c, it has the appearance of a continuous circular display with illuminated images on a central display screen 6 being surrounded by at least one illuminated icon 8 outside the display screen 6. The illuminated icon(s) 8 actually occupy an optical frame extending outside the underlying rectangular outline of the display screen 6, but this is not readily discernable when viewing the display 2. Although not shown, at other times the central display screen 6 may be turned off while one or more of the icons 8 may still be illuminated.

Figure 2:
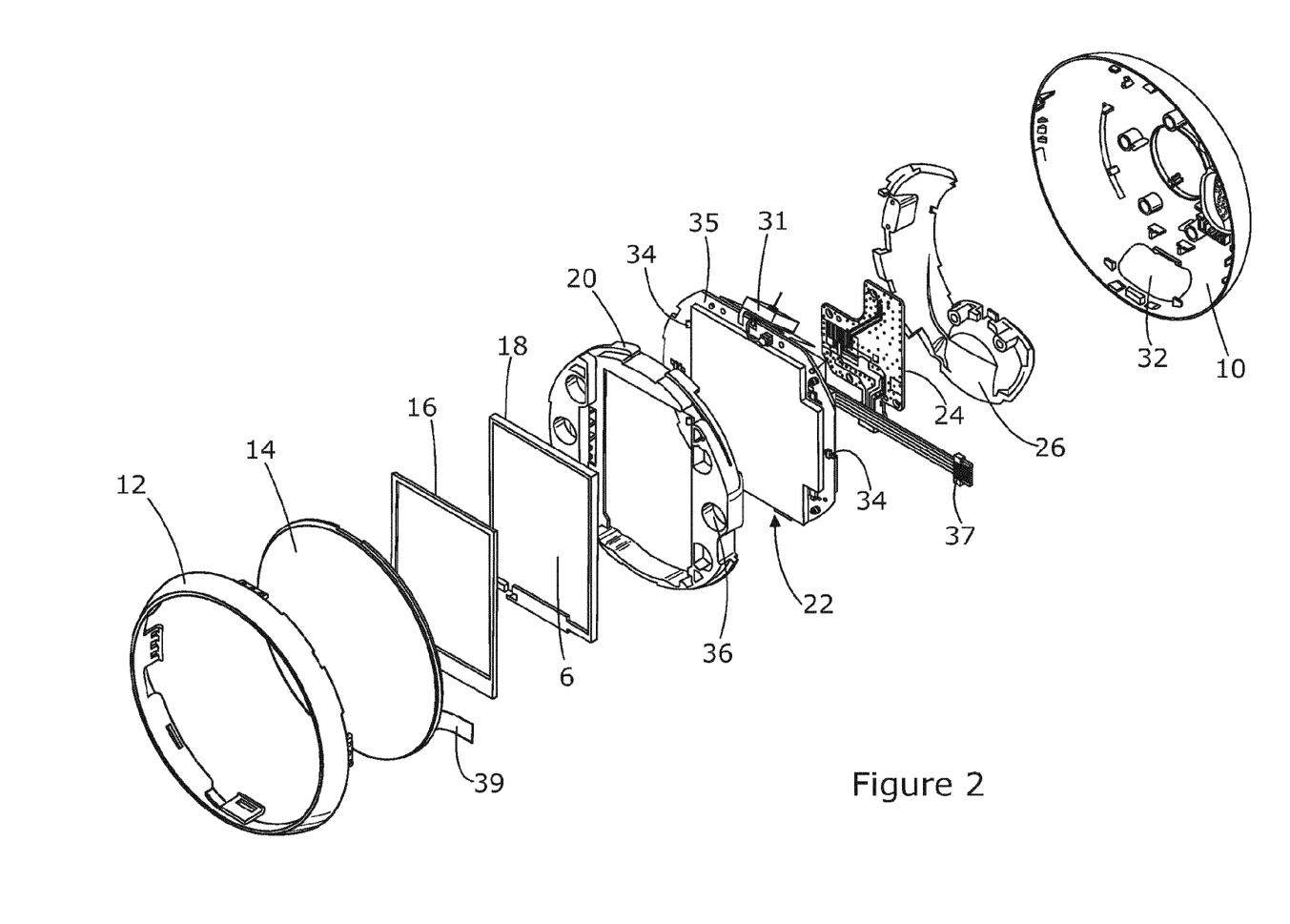
FIG. 2 is an exploded view of an embodiment of the information display device.
Figures 3A, 3B:
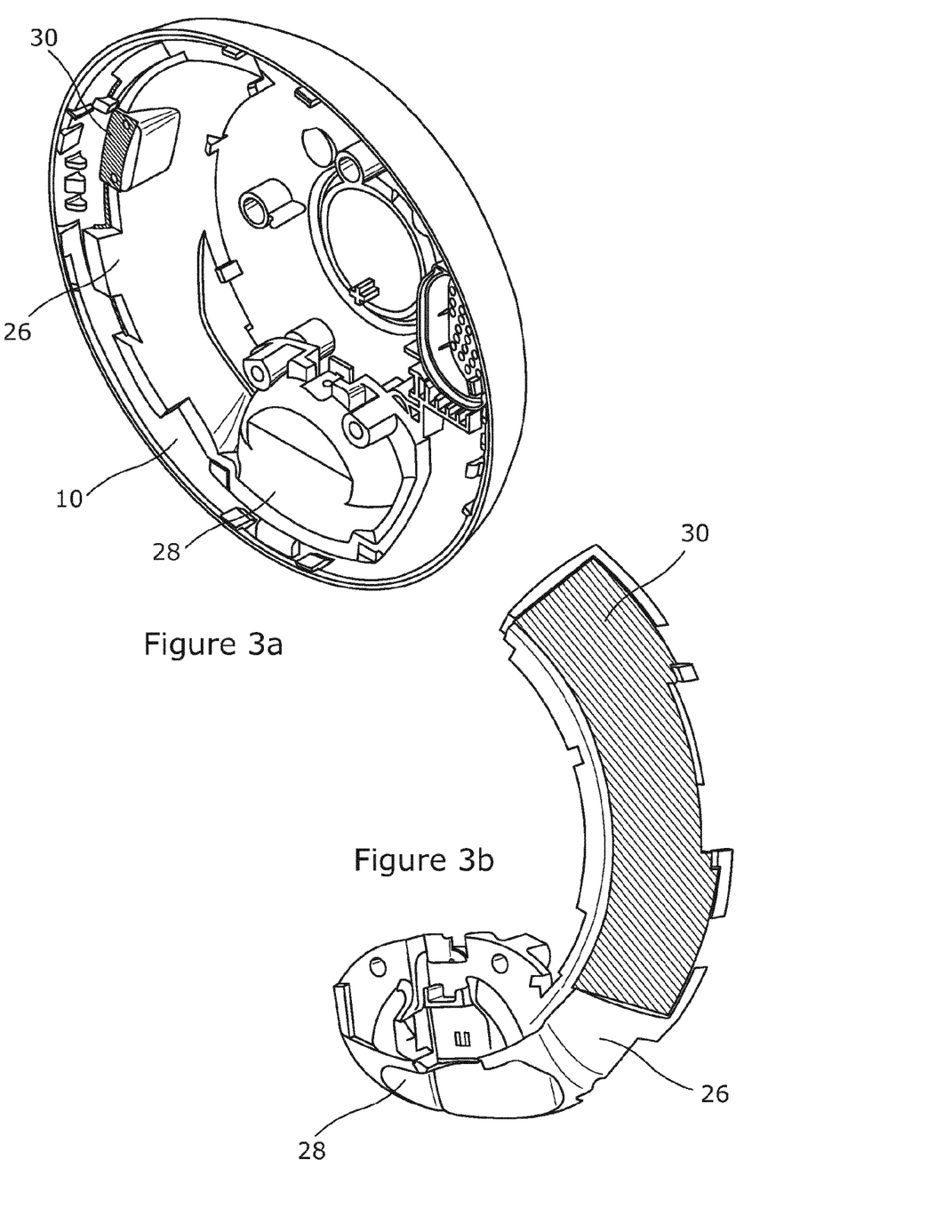
FIG. 3a shows the rear cover of the information display device.
FIG. 3b shows a rear view of a GPRS component housed within the rear cover.

The components that make up the information display device 1 are seen in more detail in FIG. 2. The outer housing 4 comprises a rear cover 10 that is connected to a front bezel 12 to seal the housing 4 closed. The circular display 2 visible at the front of the device 1 through the bezel 12 is made up of an optical element 14, sealing gasket 16, an electronic display module in the form of a liquid crystal display module (LCM) 18, a chassis 20 for the display module, and an illumination module 22. Behind these components, there is provided a GPRS system comprising a printed circuit board 24 and a GPRS antenna carrier 26. The GPRS antenna carrier 26 is seen in more detail in FIGS. 3a and 3b. The carrier 26 is an annular moulding carrying a plate-like GPRS antenna 30 on its rear surface so that, when the carrier 26 is fitted inside the rear cover 10, the antenna 30 is as close to the outer surface of the device 1 as possible. The carrier 26 and antenna 30 are both curved in two dimensions so as to fit against the rounded surface of the rear cover 10. The carrier 26 is also provided with moulded recess 28 that aligns over an aperture 32 in the rear cover 10 (seen in FIG. 2). The recess 28 can be used to mount the portable device 1, e.g. on a suitable docking station in a vehicle or other environment. The recess 28 may enable physical mounting and also an electrical connection to be made e.g. for the transfer of power and/or data.

The illumination module 22 is seen to mount multiple (six in this example) LEDs 34 which are facing forwards to illuminate respective icons 8. The illumination module 22 includes a main control board 35 mounted on its rear. This control board 35 carries an electronic controller that can selectively illuminate each of the LEDs 34, e.g. in response to user input. In front of the illumination module 22, the chassis 20 has a central rectangular aperture in which the LCM 18 is mounted by the sealing gasket 16. The LCM 18 may be a self-contained electronic display module comprising a rectangular colour LCD screen, back lighting and control electronics. The chassis 20 provides multiple light-guiding apertures 36 positioned in front of the LEDs 34 outside the area of the LCM 18. This ensures that light from the LEDs 34 is guided past the LCM 18 without being able to leak into the area in front of the LCM 18 and interfere with its display screen 6. The front bezel 12 also aids with preventing light leakage.

Figure 4A:
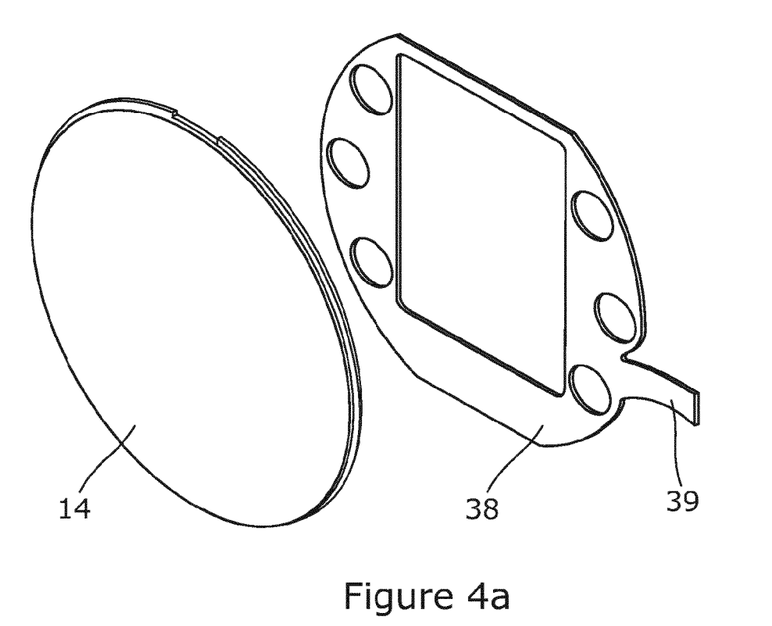
FIG. 4a is a further exploded view showing the optical element housed within an information display device according to an embodiment of the invention.
Figure 4B:
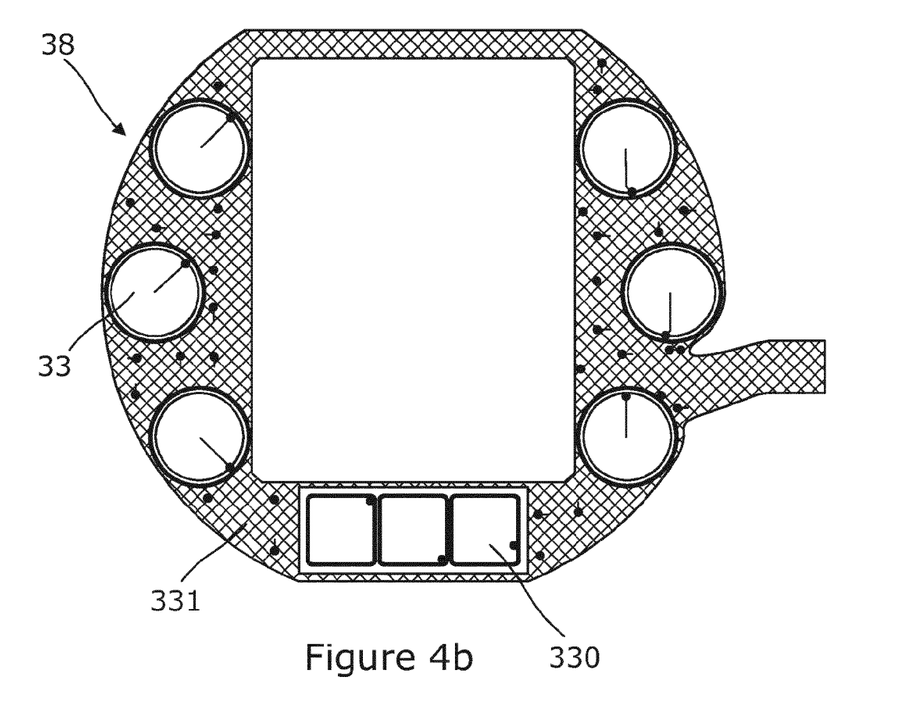
FIG. 4b shows the touch sensitive layer of the optical element.

In front of the chassis 20, and as shown in more detail in FIG. 4a, the optical element 14 includes a touch-sensitive user interface 38 at its rear. The touch-sensitive user interface layer 38, which is shown in more detail in FIG. 4b, may have apertures cut out in front of the rectangular display screen 6 of the LCM 18 and in front of the LEDs 34 to allow for illumination of the front display 2. The touch-sensitive user interface layer 38 carries a (transparent) touch pad 33 at least at the location of each icon 8, aligned in front of a respective one of the LEDs 34. One or more further touch pads 330 may be provided for other non-illuminated touch buttons, for example a "home" button positioned in the frame underneath the rectangular screen 6. A suitable touch-sensitive user interface is available from Cypress Semiconductor Corp. under the trade name CapSense® and may take the form of a flexible printed circuit board 331. It can be seen from FIGS. 2, 4a and 4b that the touch-sensitive user interface 38 has a side connector 39 that is connectable to a lead 37 from the main control board 35 so that the LEDs 34 can be controlled to operate independently in response to a user touching the icons 8.

The portable device may also utilise position sensing technology, such using GPS, to determine device location. In the embodiment shown in FIG. 2, a patch antenna 31 is located within the device on top of the illumination module 22; the patch antenna being connected to a GPS receiver on the main control board 35.

Figure 5:
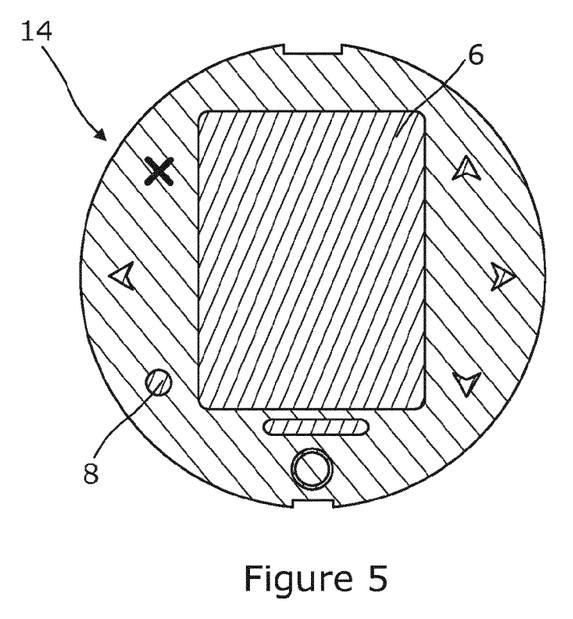
FIG. 5 shows another example of a front view of the visual display of the information display device when in use.
Figure 6A:
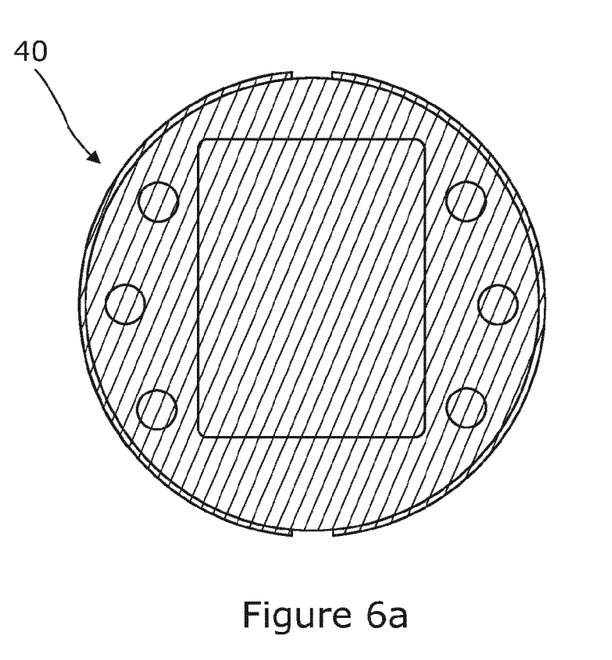
FIGS. 6a to 6d show some different optical layers of an optical element that defines a circular display for an information display device.
Figure 6B:
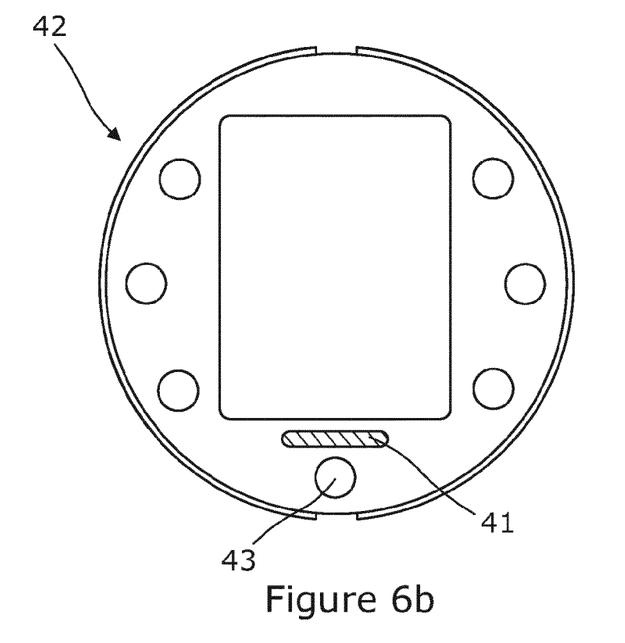
Figure 6C:
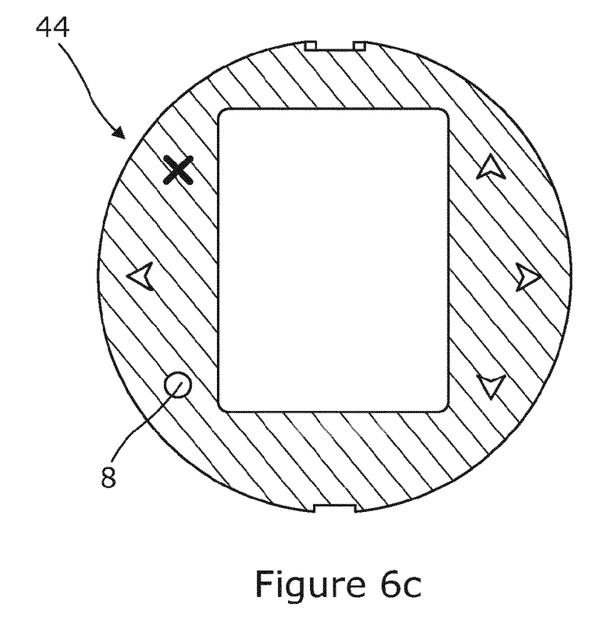
Figure 6D:
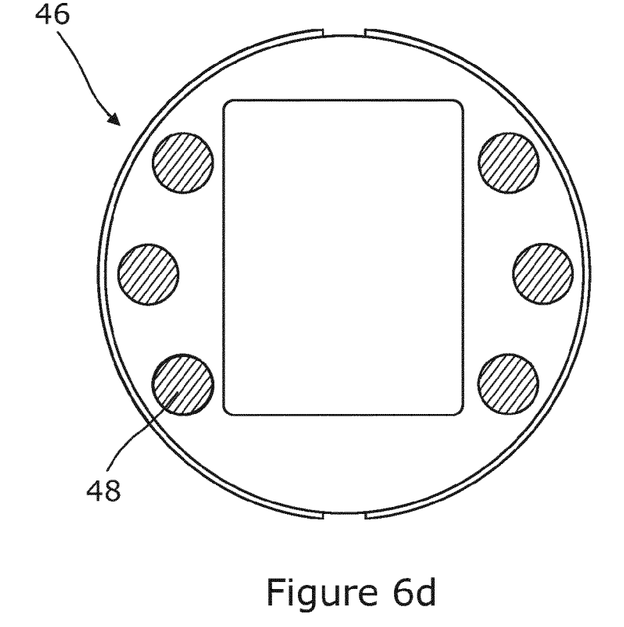

An example of the appearance of the optical element 14 is seen in FIG. 5. The optical element 14 includes several optical layers that contribute to the overall appearance of the circular display 2. The multiple optical layers, seen in FIGS. 6a to 6d, may be distinct physical layers or simply different layers of printing on the same substrate. The base layer or substrate of the optical element 14 is a plastics resin disc 40 as shown in FIG. 6a. The plastics resin, e.g. PMMA, disc 40 is not transparent (100% transmittance) as this would allow a user to discern the outline of the LCM 18 and its rectangular display screen when not in use. Instead the plastics resin disc 40 is tinted to provide a light diffusion layer. A neutral density tint having a transmittance of around 70% may be used. Another optical layer 42 as shown in FIG. 6b is transparent expect for area 41, e.g. for a logo, and outline of a touch button 43 which are printed using an ink having 0% transmittance. Another optical layer 44 as shown in FIG. 6c defines each of the icons 8 and the outline of the rectangular display screen 6 as transparent windows in a printed black background having 0% transmittance. This ensures that the display 2 is illuminated only in the areas of the rectangular display screen 6 and the icons 8, without any components positioned behind being visible. Another optical layer 46 as shown in FIG. 6d is transparent expect for tinted light diffusion areas 48 positioned to coincide with each of the icons 8. The tinted areas 48 have a transmittance of only about 20%, which helps to hide the LEDs when the icons 8 are not being illuminated and to diffuse the light from the LEDs when the icons 8 are being illuminated, to provide a more even light distribution. Of course the various optical layers 40, 42, 44, 46 may be assembled or printed in any suitable order.

Figure 1B:
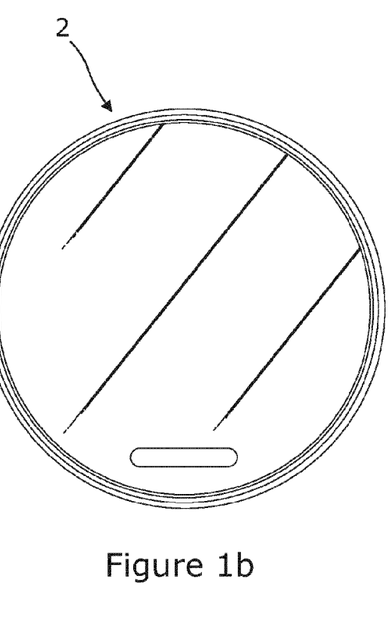
FIG. 1b is a front view of the information display device when the display is inactive.
Figure 1C:
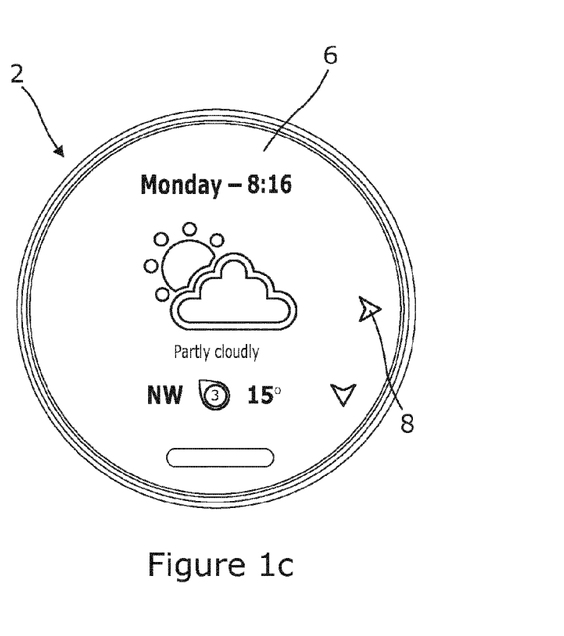
FIG. 1c is one example of a front view of the same information display device when the display is active.

In use, the front display 2 of the device 1 may appear as shown in FIGS. 1b and 1c. When the display 2 is inactive, as seen in FIG. 1b, the effect of the optical element 14 is to hide the outline of the underlying rectangular display screen 6 and provide a uniform visual appearance so that the device 1 looks like a circular gauge as typically found on a vehicle dashboard. When the display 2 is active, as seen in FIG. 1c, the effect of the optical element 14 is to allow illumination of the icons 8 and of the underlying rectangular display screen 6 to be visible but to appear as illuminated parts of a continuous circular display. The LED illumination of the icons 8 is softened by light diffusion (tinted areas 48 seen in FIG. 6d) at the edges to fade seamlessly into the black background. A user can touch any of the illuminated icons 8 to interact with the display 2. If the LCM 18 includes a touch-sensitive screen 6 then this may also be used for user input. The LCM 18 may be configured to display software images in colours matched to the black backprint of the optical element 14 and to the LEDs 34, with the images softened at their edges so that they appear to fade seamlessly into the same background as the icons 8. The device 1 therefore provides the appearance of a circular colour display even though the underlying LCM 18 has a rectangular LCD screen.

It will be appreciated that whilst various embodiments of the invention have been described herein above, the scope of the invention is not limited to the particular examples and arrangements set out herein. The present invention encompasses all arrangements, and modifications thereto, which fall within the scope of the appended claims.

For example, the device 1 may provide a display 2 that is not circular but another non-rectangular shape. Furthermore the device 1 outside the front display 2 is not limited to having the same, e.g. circular, geometry and may have any suitable shape. The device may even be a rectangular unit carrying a non-rectangular, e.g. circular, display.

Whilst embodiments described in the foregoing description refer to GPRS, it should be noted that the portable device may utilise any suitable mobile data connection. Furthermore the GPRS antenna may be replaced by a data transmitter/receiver, such as a Bluetooth transmitter/receiver, that is arranged to pair with another mobile device such as a smart phone which is linked to a telecommunications network for GPRS data communication.

It will be appreciated that the information display device preferably comprises a power source, e.g. for providing power to the LCM, illumination module and/or control electronics. The power source can take any suitable form, although preferably the power source comprises a rechargeable battery. The battery may be recharged when the portable device is docked with a suitable power connection, e.g. provided by a USB connection.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the watch may utilise any kind of position sensing technology as an alternative to (or indeed in addition to) GPS. For example, the device may utilise other global navigation satellite systems, such as the European Galileo system. Equally, it is not limited to satellite-based systems, but could readily function using ground-based beacons or other kind of system that enables the watch to determine its geographic location.

Lastly, it should be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specially enumerated in the accompanying claims at this time.

The invention claimed is:

1. A portable information display device, comprising: an electronic display module comprising:
   a substantially rectangular display screen;
   an optical element arranged in front of the electronic display module to form a non-rectangular optical frame extending outside the rectangular display screen, the optical element comprising at least one light diffusion layer having a non-zero transmittance of less than 100% located in front of the rectangular display screen so that a substantially uniform visual appearance is provided when the rectangular display screen is not illuminated, the substantially uniform visual appearance obscuring an outline of the display screen from view while the display screen is not illuminated;
   one or more light sources arranged behind the optical frame to illuminate at least one icon defined by the optical element outside the rectangular display screen; and
   an electronic controller for the one or more light sources that is arranged to selectively illuminate the at least one icon outside the rectangular display screen.

2. A portable information display device as claimed in claim 1, wherein the optical element defines a substantially circular optical frame.

3. A portable information display device as claimed in claim 1, wherein the optical element comprises an optical layer in which the at least one icon is defined as a transparent window within a background having zero transmittance.

4. A portable information display device as claimed in claim 1, wherein the optical element comprises an optical layer in which the outline of the rectangular display screen is defined as a transparent window within a background having zero transmittance.

5. A portable information display device as claimed in claim 1, wherein the optical element comprises an optical layer having a light diffusion area positioned over each icon.

6. A portable information display device as claimed in claim 1, wherein a plurality of icons are defined by the optical element outside the rectangular display screen.

7. A portable information display device as claimed in claim 6, wherein the electronic controller is arranged to selectively illuminate each one of the plurality of icons.

8. A portable information display device as claimed in claim 6, wherein the device comprises a plurality of light sources and each of the light sources is arranged to illuminate a respective icon.

9. A portable information display device as claimed in claim 1, further comprising one or more light guides arranged to transmit light from each of the one or more light sources, separately to each icon.

10. A portable information display device as claimed in claim 9, wherein the one or more light guides are integrated with a chassis mounting the electronic display module in the device.

11. A portable information display device as claimed in claim 1, further comprising touch-sensitive input device.

12. A portable information display device as claimed in claim 1, wherein the optical element comprises a touch-sensitive user interface associated with each icon defined within the non-rectangular optical frame.

13. A portable information display device as claimed in claim 12, wherein the touch-sensitive interface is connected to the electronic controller for the illumination means.

14. A portable information display device as claimed in claim 1, further comprising at least one of: a global navigation satellite systems (GNSS) antenna/receiver; and a wireless telecommunications antenna/receiver.

15. A portable information display device as claimed in claim 14, wherein the GNSS antenna/receiver is integrated with a housing for the device.

16. A portable information display device as claimed in claim 14, wherein the wireless telecommunications antenna/receiver is integrated with a housing for the device.

17. A portable information display device as claimed in claim 1, wherein the rectangular display screen is a colour LCD panel.

* * * * *